US011069966B2

(12) United States Patent
Shin

(10) Patent No.: US 11,069,966 B2
(45) Date of Patent: Jul. 20, 2021

(54) WIRE EMBEDDING HEAD FOR FORMING ANTENNA CABLE COMPRISING MULTIPLE WIRES

(71) Applicant: Hye Joong Shin, Daejeon (KR)

(72) Inventor: Hye Joong Shin, Daejeon (KR)

( * ) Notice: Subject to any disclaimer, the term of this patent is extended or adjusted under 35 U.S.C. 154(b) by 0 days.

(21) Appl. No.: 16/765,734

(22) PCT Filed: Nov. 13, 2018

(86) PCT No.: PCT/KR2018/013806
§ 371 (c)(1),
(2) Date: May 20, 2020

(87) PCT Pub. No.: WO2019/107798
PCT Pub. Date: Jun. 6, 2019

(65) Prior Publication Data
US 2020/0295448 A1    Sep. 17, 2020

(30) Foreign Application Priority Data
Nov. 28, 2017 (KR) .................. 10-2017-0160101

(51) Int. Cl.
*H01Q 1/38* (2006.01)
(52) U.S. Cl.
CPC .................... *H01Q 1/38* (2013.01)
(58) Field of Classification Search
None
See application file for complete search history.

(56) References Cited

U.S. PATENT DOCUMENTS

| 6,698,089 B2* | 3/2004 | Finn .............. G06K 19/077 29/748 |
| 8,397,377 B2* | 3/2013 | Lolli ............... H01Q 1/38 29/748 |
| 8,646,675 B2* | 2/2014 | Lang .............. H05K 13/06 228/4.5 |

FOREIGN PATENT DOCUMENTS

| JP | 2004-119922 A | 4/2004 |
| KR | 10-1057585 B1 | 8/2011 |
| KR | 10-1078027 B1 | 10/2011 |
| KR | 10-1329357 B1 | 11/2013 |

(Continued)

OTHER PUBLICATIONS

International Search Report dated Feb. 18, 2019, issued in connection with International Application No. PCT/KR2018/013806, filed on Nov. 13, 2018, 4 pages.

(Continued)

*Primary Examiner* — Anh Q Tran
(74) *Attorney, Agent, or Firm* — McDonnell Boehnen Hulbert & Berghoff LLP

(57) ABSTRACT

The present invention relates to a wire embedding head for forming an antenna cable comprising multiple wires and, more particularly, to a wire embedding head for forming an antenna cable comprising multiple wires, which: allows wires to be embedded in a substrate while being connected in a parallel pattern by means of an ultrasonic wave generating part and multiple wire embedding horns so as to form an antenna cable; and enables an arrangement of the antenna cable embedded in the substrate and connected in a parallel pattern to be formed very densely by using a distinguishing coupling relation between the substrate and the multiple wires embedded in the substrate.

2 Claims, 7 Drawing Sheets

(56) References Cited

FOREIGN PATENT DOCUMENTS

KR        10-1665033  B1    10/2016

OTHER PUBLICATIONS

Written Opinion dated Feb. 18, 2019, issued in connection with International Application No. PCT/KR2018/013806, filed on Nov. 13, 2018, 4 pages.

* cited by examiner (a) (b)

WIRE EMBEDDING HEAD FOR FORMING ANTENNA CABLE COMPRISING MULTIPLE WIRES

CROSS-REFERENCE TO RELATED APPLICATIONS

The present application is a U.S. National Phase Application under 35 U.S.C. § 371 of International Application No. PCT/KR2018/013806 filed Nov. 13, 2018, which claims priority to Korean Patent Application No. 10-2017-0160101 filed Nov. 28, 2017, the disclosures of each of which are incorporated herein by reference in their entirety.

TECHNICAL FIELD

The present invention relates to a wire embedding head for forming an antenna line having multiple wires as a line, and more particularly, to the wire embedding head for forming an antenna line having multiple wires as a line, in which wires connected in a parallel pattern as an antenna line are embedded in a substrate by an ultrasonic generator and a multi-wire embedding horn; and an arrangement of the antenna line, which is embedded in the substrate and connected in a parallel pattern, is densified by the substrate and a distinguishing coupling relation between the plurality of wires embedded in the substrate.

BACKGROUND ART

Recently, the evolution of wireless technology has led to the development of wireless charging technology for electronic devices.

In addition, due to the development of wireless devices, demand for short range wireless communication antennas is rapidly increasing; and thus, various antennas for improving communication efficiency between a transmission module (Tx, Transmitter) and a reception module (Rx, Receiver) are developed and applied.

Among them, methods for forming antennas for short range wireless communication and antennas for wireless charging are classified into three methods:

Firstly, wet etching method;

Secondly, a method in which an antenna line formed by punching a copper foil and formed in a predetermined pattern is fixed on a substrate by using an adhesive; and Thirdly, a method in which a conductor is embedded in a substrate and an antenna line having a predetermined pattern is formed.

At this time, since the wet etching method is to form an antenna line by corroding parts except for the antenna line by using strong acidic chemicals, not only are initial costs excessively high but also strong acidic chemicals are used, thereby causing environmental pollution which requires installation of separate anti-pollution facilities and systems to neutralize them.

On the other hand, the method of manufacturing an antenna line by punching a copper foil, which is similar to the wet etching method regarding formation of an antenna line, compensates for the disadvantage of the wet etching method and allows the antenna line to be generated mechanically without using chemical substances.

Therefore, antenna lines formed by wet etching and antenna lines formed by the mechanical method that punch copper foil have been widely used in recent years.

However, whether the wet etching method or the method of bonding an antenna line by punching copper foil, the use of adhesives is inevitable in order to form antenna lines on a substrate, resulting in poor durability, such as defects due to gaps caused by antenna lines falling from the substrate, as well as disadvantages, such as production cost increase and loss of transmission efficiency such as loss of efficiency between transmission and reception due to the adhesives applied to each layer in a case of having a so-called laminated structure that extends a surface of an antenna line in order to increase efficiency between transmitting and receiving antennas, such as in wireless charging.

On the other hand, the method of embedding a coil using the coil as an antenna line is advantageous in that it is easy to manufacture; and since it is formed as a single layer and thus there is no inter-layer interfering material, it is possible to increase efficiency between transmission and reception. However, since a diameter of the antenna line should be increased enough to widen the antenna line surface area, this method may not be suitable for miniaturization of electronic devices.

Therefore, in order to make the surface area wider and thin like an antenna line formed by punching copper foil or the wet etching method consisting of vertical lamination, the antenna line consisting of thin coils in parallel, which is a form in which the thin coils are arranged horizontally, is ideal, and embedding the antenna line on a substrate without using adhesives is the most optimal way to form the antenna line.

To this end, a separate device is required to form an antenna line in which multiple lines are concurrently connected in a parallel pattern.

As a prior art relating to a wire embedding head for forming an antenna line using multiple wires as a line, there has been proposed Korean Patent Application Publication No. 2002-0087320 "Winding-and-embedding apparatus of multi-head type for manufacturing IC chip-installed cards" (hereinafter referred to as, "Prior art 1"), as shown in FIG. 7(a), wherein an IC chip is mounted on each card sheet on a pattern sheet, on which a plurality of card sheets are arranged, by displacing an antenna line connected to the IC chip and a connection unit of the IC chip between at least two card sheets in order to manufacture the IC chip-installed card; wires are wound and embedded in each card sheet of the pattern sheet by using ultrasonic waves in order to form the antenna line in a predetermined pattern in which each end portion of the antenna line passes through connecting portions of the IC chip on each card sheet of the pattern sheet on which the IC chip is mounted; at least two or more winding-and-embedding heads, with an ultrasonic generator that generates ultrasonic waves at frequencies of 50 kHz or more, make frequencies of an ultrasound vibrator, installed with a pitch of 60 mm or less, more higher frequencies so that it becomes possible to improve embedding quality of the antenna line which is embedded; and it is also possible to increase productivity by installing multiple heads.

As another prior art, there has been proposed Korean Patent Application Publication No. 10-2013-0108068 "Manufacturing RFID inlays" (hereinafter referred to as, "Prior art 2"), as shown in FIG. 7(b), in which an antenna structure is formed in a form that wires, thin films, or conductive materials are wound on an antenna substrate or in a carrier substrate; the antenna structure is transferred one by one or several at a time to a transponder area, which corresponds to an inlay substrate; a plurality of antenna structures is formed at a plurality of antenna areas on the antenna substrate, which connects terminal areas of the RFID chip module in transponder areas and connecting ends of the antenna structure; and the antenna structure is transferred to a selected one of the transponder areas.

As described above, Prior arts 1 and 2 relate to an apparatus for embedding an antenna line on a substrate and a method for manufacturing an RFID inlay. However, although the technical field of Prior arts 1 and 2 is similar to that of the present invention, the technical features, that is, the constitution, the object, and the effect thereof of Prior arts 1 and 2 are different from those of the present invention.

On the other hand, Prior art 1 describes an embedding head that embeds an antenna line to a substrate by using ultrasonic waves, and thus, the overall technical concept may be similar to that of the present invention. However, as described above, the technical features, that is, the constitution, object, and effect of Prior art 1 are different from those of the present invention. Both Prior art 1 and Prior art 2 fail to solve the problems to be solved by the present invention. In other words, Prior arts 1 and 2 have technical limitations that cannot solve density problem between the wires of the antenna line which are formed by being connected in a parallel pattern.

PRIOR ART LITERATURE (Patent Document 1) Korean Patent Application Publication No. 2002-0087320 (Nov. 22, 2002)
(Patent Document 2) Korean Patent Application Publication No. 10-2013-0108068 (Oct. 2, 2013)

DISCLOSURE

Technical Problem

Accordingly, the present invention has been made to solve the existing problems mentioned above.

A purpose of the present invention is to provide a head housing in which a plurality of wires are embedded in a substrate at a specific frequency of ultrasonic waves to form antenna lines.

Another purpose of the present invention is to form an antenna line in which a plurality of wires are connected in a parallel pattern by embedding wires into a substrate by using vibration from ultrasonic waves.

Further, another purpose of the present invention is to enhance communication efficiency by providing an antenna line formed by connecting a plurality of wires in a parallel pattern and discharging a plurality of wires by a specific arrangement so as to densify the arrangement of antenna lines formed in a parallel pattern.

Technical Solution

In order to achieve the above object, the present invention has been made to solve the above problems.

A wire embedding head for forming an antenna line having a plurality of wires is provided, which comprises:

a head housing for embedding wires such that the wires wound around the spool are inserted and an antenna line is formed at a specific position determined on a substrate;

an ultrasonic generator for melting a specific position of the substrate when the wires are embedded, the ultrasonic generator being formed at one end of the head housing and generating vibration of 30 kHz to 60 kHz so that the wires are embedded at a specific position determined in the substrate and form the antenna line; and a multi-wire embedding horn in which a plurality of wire outlets are formed in a specific arrangement so that the plurality of wires are simultaneously discharged and embedded in the substrate to form the antenna line, which is connected in a parallel pattern, wherein when two or more wire outlets are formed in the multi-wire embedding horn, a second wire outlet is formed such that a straight center line of a first wire outlet and a straight center line of the second wire outlet are shifted from each other with respect to the first wire outlet; and the straight center line of the first wire outlet, a straight center line of a third wire outlet, and a straight center line of a nth wire outlet are located on a same line or shifted from each other from a third wire outlet; and an arrangement of the antenna line in which a plurality of wires is embedded and formed in a parallel pattern is densified, thereby maximizing communication efficiency.

At this time, the plurality of wire outlets formed in the multi-wire embedding horn may be formed to be in contact one by one based on the first wire outlet.

On the other hand, terms and words used in the claims of the specification should not be construed in a conventional or dictionary sense, but should be construed as conforming to the technical ideas of the present invention on the basis of the principle that an inventor can properly define the concept of a term to describe his or her own invention in the best way.

Therefore, it is to be understood that there may be various equivalents and variations at the time of the present application since the embodiments of the specification and the constitutions of the drawings are only preferred examples of the present application, but not all of the technical ideas of the present application are represented by them.

Advantageous Effects

According to the present application, as described above in the constitution and operation, it provides a head housing in which a plurality of wires is embedded in a substrate at a specific frequency of ultrasonic waves to form antenna lines.

Further, it enhances communication efficiency by embedding wires discharged from a multi-wire embedding horn in a substrate by using vibration by ultrasonic waves generated by an ultrasonic generator and forming an antenna line in which a plurality of wires are connected in a parallel pattern.

At this time, it maximizes communication efficiency by forming an antenna line by connecting a plurality of wires in a parallel pattern and discharging a plurality of wires from a plurality of wire outlets formed in a specific arrangement so as to densify an arrangement of antenna lines formed in a parallel pattern.

Further, it is not necessary to arbitrarily enlarge the diameter of the wires to improve the communication efficiency of the antenna line or form a multilayer structure in which wires are laminated. It is a very effective invention that forms an antenna line connected in a parallel pattern having excellent communication efficiency, as a future-oriented technology suitable for present trends and an essential technology for miniaturization of electronic devices.

DETAILED DESCRIPTION OF THE MAIN REFERENCE NUMERALS OF THE DRAWINGS

Figure 1:
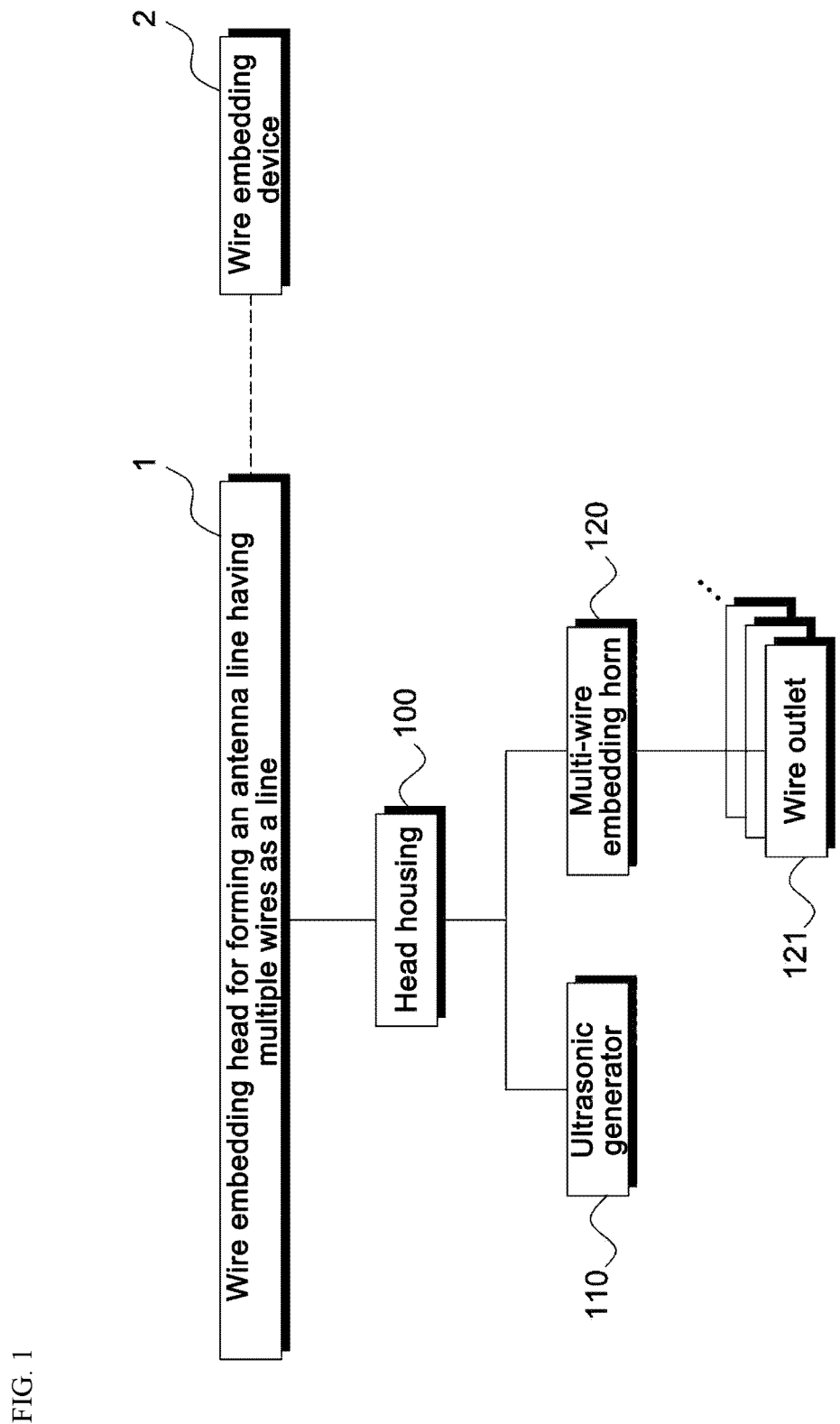
FIG. 1 is a configuration diagram of a wire embedding head for forming an antenna line having multiple wires as a line according to the present invention.

1: Wire embedding head for forming an antenna line having multiple wires as a line
2: Wire embedding device
100: Head housing
110: Ultrasonic generator
120: Multi-wire embedding horn
121: Wire outlet
121a: First wire outlet
121b: Second wire outlet
121c: Third wire outlet
121d: Fourth wire outlet
121aW: First wire
121bW: Second wire
121cW: Third wire
121dW: Fourth wire
B: Substrate
E: Virtual multi-wire embedding horn
G: Gap
S: Spool
W: Wire
AW: Antenna line
CL1, CL2, CL3, CL4, CLn: Straight center lines
N1, N2, N3, N4: Virtual wire outlets
N1W, N2W, N3W, N4W: Virtual wires

BEST MODE FOR THE INVENTION

Hereinafter, functions, configurations, and operations of a wire embedding head for forming an antenna line having multiple wires as a line according to the present invention will be described in detail with reference to the accompanying drawings.

Figure 2:
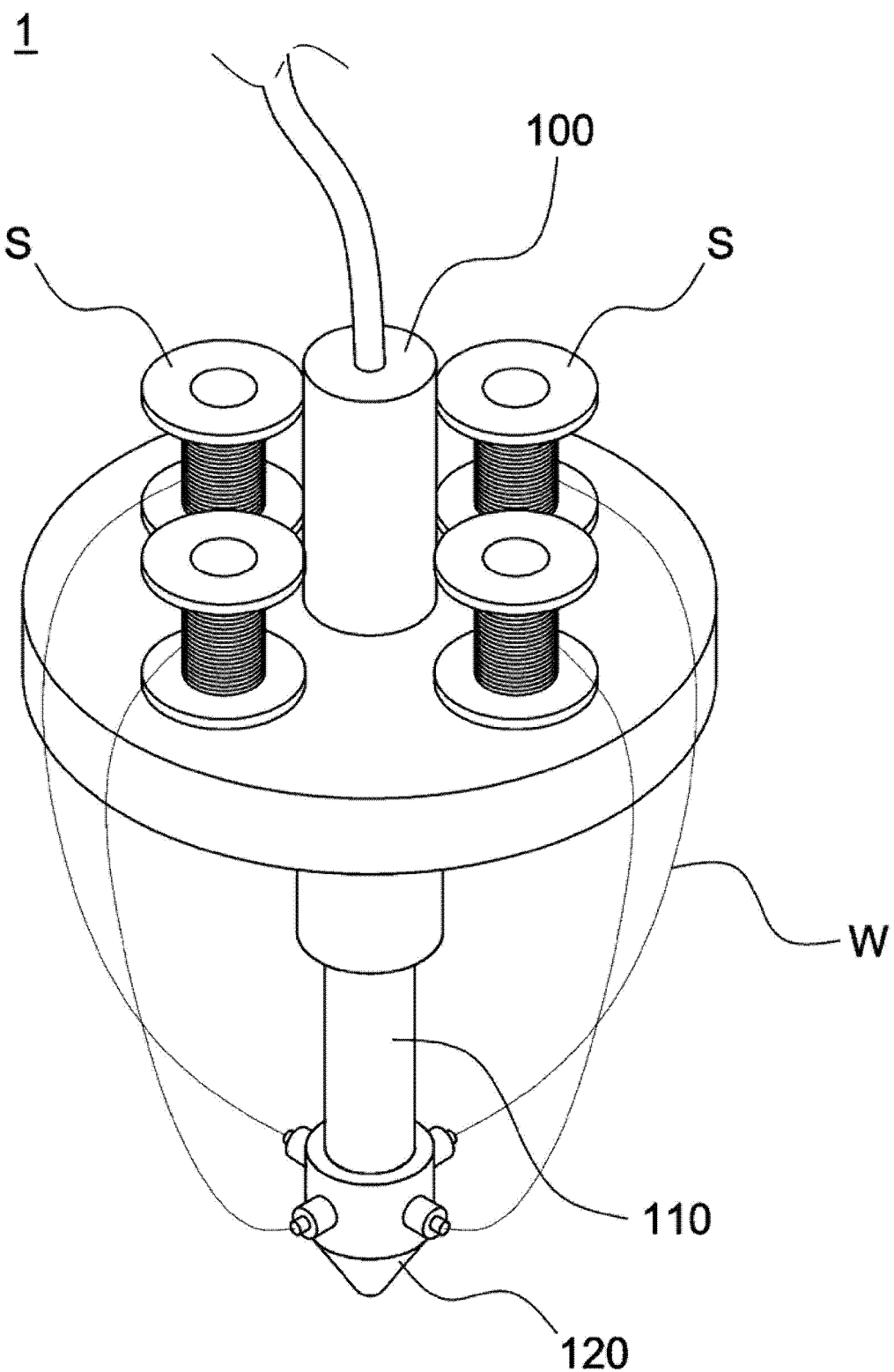
FIG. 2 is a schematic diagram of a wire embedding head for forming an antenna line having multiple wires as a line according to the present invention.

FIG. 1 is a configuration diagram of a wire embedding head for forming an antenna line having multiple wires as a line according to the present invention; FIG. 2 is a schematic diagram of a wire embedding head for forming an antenna line having multiple wires as a line according to the present invention; and FIG. 3 shows an example of a bottom cross-section view of a multiple wire embedding horn which is a component of a wire embedding head for forming an antenna line having multiple wires as a line according to the present invention.

Figure 3:
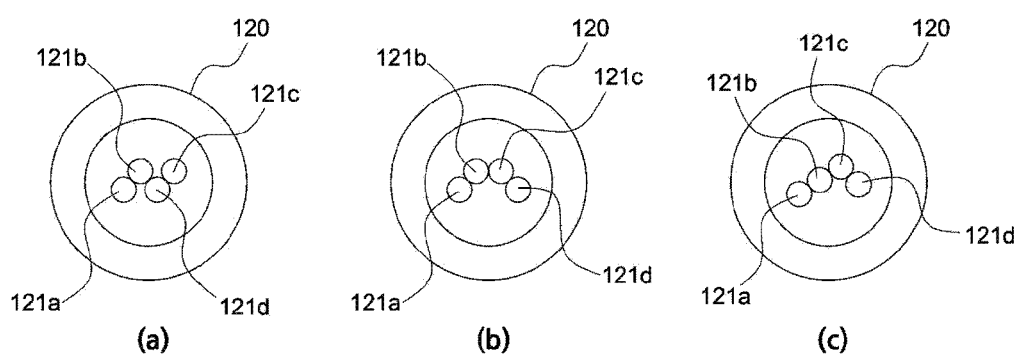
FIG. 3 shows an example of a bottom cross-section view of a multiple wire embedding horn which is a component of a wire embedding head for forming an antenna line having multiple wires as a line according to the present invention.

As shown in FIGS. 1 to 3, the present invention comprises:

a wire embedding head 1 for forming an antenna line having multiple wires as a line, which comprises:

a head housing 100 for embedding wires W such that the wires W wound around the spool S are inserted and an antenna line AW is formed at a specific position determined on a substrate B;

An ultrasonic generator 110 for melting a specific position of the substrate B when the wires W are embedded, which is formed at one end of the head housing 100 and generates vibration of 30 kHz to 60 kHz so that the wires W are embedded at a specific position determined in the substrate B and form the antenna line AW;

A multi-wire embedding horn 120 in which a plurality of wire outlets 121 is formed in a specific arrangement so that a plurality of wires W are simultaneously discharged and embedded in the substrate B to form the antenna line AW which is connected in a parallel pattern.

When two or more wire outlets 121 are formed in the multi-wire embedding horn 120, a second wire outlet 121b is formed such that a straight center line CL1 of a first wire outlet 121a and a straight center line CL2 of the second wire outlet 121b are shifted from each other with respect to the first wire outlet 121a; and the straight center line CL1 of the first wire outlet 121a, a straight center line CL3 of a third wire outlet 121c, and a straight center line CLn of a nth wire outlet are located on a same line or shifted from each other from the third wire outlet 121c; and an arrangement of the antenna line AW in which the plurality of wires W are embedded and formed in a parallel pattern is densified, thereby maximizing communication efficiency.

Figure 4:
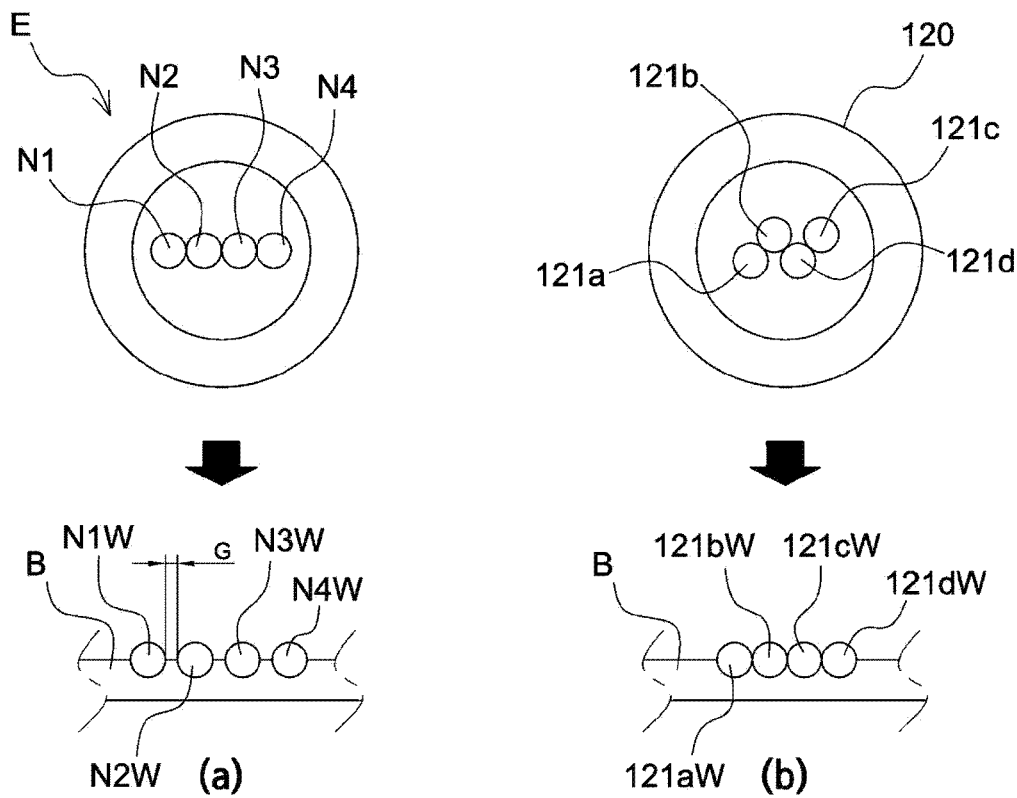
FIG. 4 shows an example of an effect when a plurality of wires is embedded in a substrate due to a multiple wire embedding horn in which a plurality of wire outlets is formed in a specific arrangement, which is a component of a wire embedding head for forming an antenna line having multiple wires as a line according to the present invention.
Figure 5:
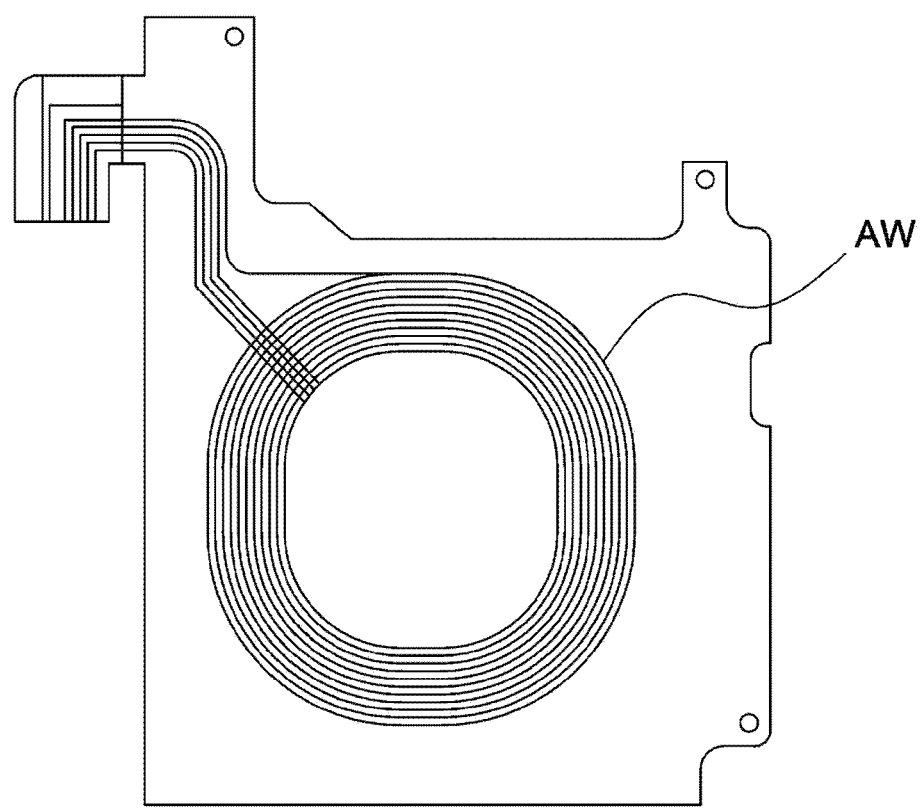
FIG. 5 shows an example of an antenna line embedded in a substrate, which is completed by a wire embedding head for forming an antenna line having multiple wires as a line according to the present invention.

That is, as shown in FIG. 4(b), the plurality of wires W, which is discharged from the plurality of wire outlets 121 formed in a specific arrangement in the multi-wire embedding horn 120, is embedded in the substrate B; and the antennal line AW in which the plurality of wires W are connected in a parallel pattern in the substrate B is formed in order that a gap G between a first wire 121aW discharged from the first wire outlet 121a and embedded in the substrate B, a second wire 121bW discharged from the second wire outlet 121b and embedded in the substrate B, a third wire 121cW discharged from the third wire outlet 121c and embedded in the substrate B, and a fourth wire 121dW discharged from the fourth wire outlet 121d and embedded in the substrate B is not generated or minimized, thereby providing a head housing 100 which is necessary to make an inlay manufacturing technique that maximizes communication efficiency.

FIG. 4(a) is a comparative example to compare with FIG. 4(b) in order to explain the effect of the present invention. In FIG. 4(a), although a virtual multi-wire embedding horn E comprising a plurality of wire outlets N1, N2, N3, and N4 is formed as in the present invention, and it may be possible to form an antenna line AW which is connected in a parallel pattern as in the present invention; however, a gap G is necessarily generated when the plurality of wire outlets N1, N2, N3, and N4 are embedded in the substrate B without a specific arrangement regarding the plurality of wire outlets 121 formed in the multi-wire embedding horn 120, so that there is a clear difference between this example and the present invention.

That is, the present invention forms the antenna line AW in which the plurality of wires W embedded in the substrate B are connected in a parallel pattern, without the gap G between the plurality of wires W, by using a property that a specific position of the substrate B melted by a ultrasonic wage generator 110 varies flexibly and a characteristic regarding the coupling relation between the plurality of wires W, which is generated when the plurality of wires W are embedded in the substrate B, thereby maximizing communication efficiency by increasing current flow by generating a wide surface area without stacking the wires W.

Here, the characteristic of the coupling relation between the plurality of wires W will be briefly described.

It means a characteristic that when the plurality of wires W is discharged and embedded in a specific position of the substrate B which has been flexibly changed by the ultrasonic generator 110, although the plurality of wire outlets N1, N2, N3, and N4 are in contact from each other in a row without a space therebetween as shown in FIG. 4(a), the gap G is necessarily generated when a plurality of wires N1W, N2W, N3W, and N4W are embedded in the substrate B.

Accordingly, the present invention is directed to solve the problem regarding the coupling relation between the plurality of wires W in which the gap G is formed at a predetermined interval when the plurality of wires W is coupled. The present invention is characterized in that the plurality of wire outlets 121 formed in the multi-wire embedding horn 120 is formed to be in contact one by one in a specific arrangement based on the first wire outlet 121a as shown in FIG. 3.

Figure 6:
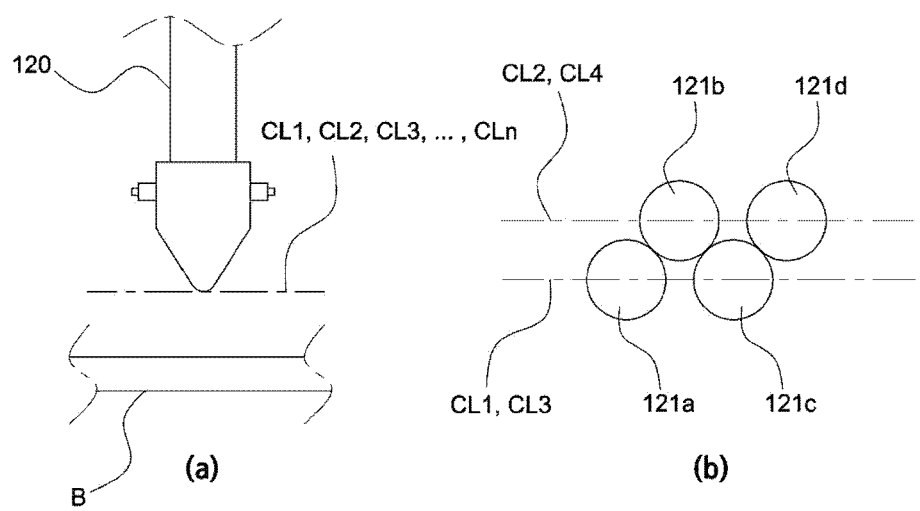
FIG. 6 shows an example for explaining a straight center line generated in a plurality of wire outlets, which is a component of a wire embedding head for forming an antenna line having multiple wires as a line according to the present invention.
Figure 7:
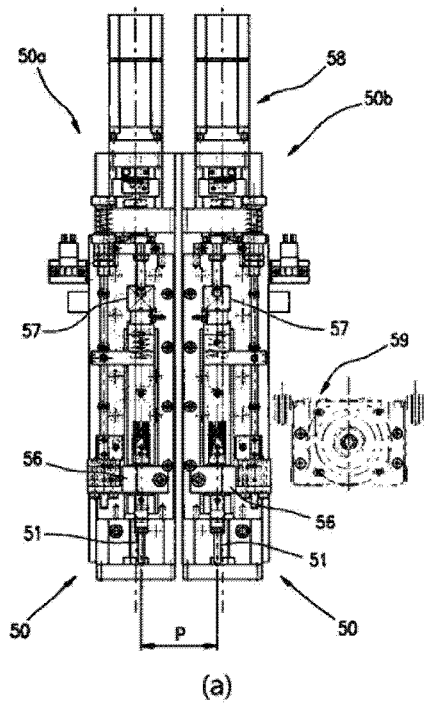
FIG. 7 is a representative view of a prior art regarding a wire embedding head for forming an antenna line having multiple wires as a line according to the present invention
Figure 7:
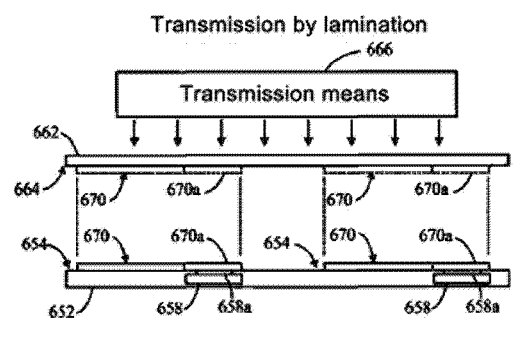

FIG. 6 illustrates the straight center lines CL1, CL2, CL3, . . . , CLn generated respectively in the plurality of wire outlets 121 formed in the multi-wire embedding horn 120.

FIG. 6(a) shows that the straight center lines CL1, CL2, CL3, . . . , CLn generated respectively in the plurality of wire outlets 121 are horizontal lines parallel to the substrate B.

FIG. 6(b) shows the relations between the straight center line CL1 generated in the first wire outlet 121a, the straight center line CL2 generated in the second wire outlet 121b, the straight center line CL3 generated in the third wire outlet 121c, and the straight center line CL4 generated in the fourth wire outlet 121d, based on the first wire outlet 121a from the straight center lines CL1, CL2, CL3, . . . , CLn generated respectively in the plurality of wire outlets 121.

That is, the straight center lines CL1, CL2, CL3, . . . , CLn of the straight center line CL1 of the first wire outlet 121a to the straight center line CL4 of the fourth wire outlet 121d means straight lines parallel to the substrate B passing through a center of the wire outlet 121, where N means the number of the plurality of wire outlets 121 formed in the multi-wire embedding horn 120.

In addition, "shifted" means that the straight center lines CL1, CL2, CL3, . . . , CLn are not located on a same line.

That is, FIG. 6(a) shows a front view of the multi-wire embedding horn 120 and the substrate B. As shown in FIG. 6(a), the straight center lines CL1, CL2, CL3, . . . , CLn respectively formed in the plurality of wire outlets 121 should be made of horizontal lines parallel to the substrate B. FIG. 6(b) is a bottom cross-section view that shows the center lines CL1, CL2, CL3, . . . , CLn which are respectively generated by the formation of the plurality of wire outlets 121.

At this time, as shown in FIG. 6(b), a straight center line CL1 generated in the first wire outlet 121a and a straight center line CL3 generated in the third wire outlet 121c are located on a same line, and the straight center line CL2 generated in the second wire outlet 121b and the straight center line CL4 generated in the fourth wire outlet 121d are located on a same line. The straight center line CL1 of the first wire outlet 121a and the straight center line CL2 of the second wire outlet 121b are shifted from each other according to the description of the present invention.

In summary, the present invention is to provide an antenna line AW for solving the problem that a high power signal cannot be handled due to the structure of a conventional general patch antenna, and thus improving communication efficiency. To solve this problem, the substrate B is melted by generating heat at a specific position of the substrate B by vibration generated by the ultrasonic generator 110, the antenna line AW is embedded in the substrate B by applying a certain pressure to a molten portion, and thus the antenna line AW is generated, which is formed by the plurality of wires W, and there is no gap G between the wires W connected in a parallel pattern.

At this time, the reason for simultaneously embedding a plurality of wires (W) is as follows:

because in the efficiency of wireless charging, matching between a transmitting module (Tx, Transmitter) and a receiving module (Rx, Receiver) and a flow of current generated in the receiving module (Rx, Receiver) are absolutely important to the charging efficiency, which is to ensure that a wide surface area of the antenna line AW is secured so that high-speed communication and communication efficiency can be improved through free movement of electrons. (The current flow is proportional to a surface area of a conductor, that is, the antenna line AW formed of the plurality of wires W.)

That is, a receiving module (Rx) receiving a magnetic field generated from a transmitting module (Tx, Transmitter) generates electricity by magnetic resonance or magnetic induction. Current generated at this time will flow along the surface of the conductor (the antenna line AW).

Therefore, since the role of the antenna line AW of the receiving module (Rx, Receiver) is to collect current in a manner such that loss of the generated current is minimized, it has a close relation with purity and surface area of the conductor (the antenna line AW). That is, the larger the surface area of the conductor (the antenna line AW), the better the transmission power. Therefore, in order to widen the surface area of the conductor (the antenna line (AW) within a limited thickness to form the conductor (the antenna line) according to miniaturization of an electronic device, it is most desirable to construct multiple strands of coils (the wires W) in a parallel pattern.

Therefore, the present invention is a technology that maximizes charging and communication efficiency of the antenna line AW by increasing the surface area of the antenna line AW through dense arrangement of the antenna line AW connected in a parallel pattern and using high-purity coil (the wires W).

For reference, densifying of the gap G between the wires W connected by a parallel pattern formed by the plurality of wires W according to of the present invention means specifically forming the plurality of wires W in a parallel pattern for the gap G to be within a range of 0 to 5 um.

In addition, the present invention describes the formation of four wire outlets 121 in the multi-wire embedding horn 120, as an example. It is possible to form two or more plural wire outlets 121, as described above.

In addition, "multiple wires" and "plurality of wires" used in describing the technology of the present invention have the same meaning and are used interchangeably according to the flow of description.

As described above, the present invention is not limited to the described embodiments, and it is obvious to those skilled in the art that various modifications and variations can be made without departing from the spirit and scope of the present invention.

Therefore, it is to be understood that the present invention may be embodied in many other specific forms without departing from the technical idea or essential characteristics thereof, and the embodiments are to be considered in all respects as illustrative and not restrictive.

INDUSTRIAL APPLICABILITY

The present invention relates to a wire embedding head for forming an antenna line having a plurality of wires as a line. The present invention is applicable to manufacturing and sales industries thereof, more specifically to formation of NFC recognition antennas built into electronic devices such as mobile phones and inlays for identification cards with embedded contactless chips such as electronic passports and electronic resident cards, and to development of various electronic device industries that require receiving module antennas for wireless charging devices.

The invention claimed is:

1. A wire embedding head 1 for forming an antenna line having multiple wires as a line, comprising:
   a head housing 100 for embedding wires W such that the wires W wound around a spool S are inserted and an antenna line AW is formed at a specific position determined on a substrate B;
   an ultrasonic generator 110 for melting a specific position of the substrate B when the wires W are embedded, the ultrasonic generator being formed at one end of the head housing 100 and generating vibration of 30 kHz to 60 kHz so that the wires W are embedded at a specific position determined in the substrate B and form the antenna line AW; and
   a multi-wire embedding horn 120 in which a plurality of wire outlets 121 is formed in a specific arrangement so that the plurality of wires W are simultaneously discharged and embedded in the substrate B to form the antenna line AW, which is connected in a parallel pattern,
   wherein when two or more wire outlets 121 are formed in the multi-wire embedding horn 120, a second wire outlet 121b is formed such that a straight center line CL1 of a first wire outlet 121a and a straight center line CL2 of a second wire outlet 121b are shifted from each other with respect to the first wire outlet 121a; and the straight center line CL1 of the first wire outlet 121a, a straight center line CL3 of a third wire outlet 121c, and a straight center line CLn of an nth wire outlet are located on a same line or shifted from each other from the third wire outlet 121c; and
   an arrangement of the antenna line AW, in which the plurality of wires W are embedded and formed in a parallel pattern, is densified, thereby maximizing communication efficiency.

2. The wire embedding head of claim 1, wherein
   the plurality of wire outlets 121 formed in the multi-wire embedding horn 120 is formed to be in contact one by one based on the first wire outlet 121a.

* * * * *